United States Patent
Saegusa

(10) Patent No.: US 6,546,498 B1
(45) Date of Patent: Apr. 8, 2003

(54) SYSTEM AND PROCESS FOR DETECTING/ELIMINATING FAULTY PORT IN FIBER CHANNEL-ARBITRATED LOOP

(75) Inventor: Takuya Saegusa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/452,456

(22) Filed: Dec. 2, 1999

(30) Foreign Application Priority Data

Dec. 2, 1998 (JP) .......................... 10-343282

(51) Int. Cl.⁷ .............................................. G06F 13/00
(52) U.S. Cl. ........................... 714/4; 714/716; 714/717; 370/217; 370/223
(58) Field of Search ........................ 714/4, 716, 717; 370/223, 217

(56) References Cited

U.S. PATENT DOCUMENTS 5,535,035 A  *  7/1996 DeFoster et al. ............ 370/223
6,032,266 A  *  2/2000 Ichinohe et al. .............. 714/21
6,128,750 A  *  10/2000 Espy et al. ..................... 714/4
6,173,411 B1  *  1/2001 Hirst et al. .................. 709/223
6,397,345 B1  *  5/2002 Edmonds et al. .............. 714/4
2001/0052084 A1  *  12/2001 Huang et al. .................. 714/4

FOREIGN PATENT DOCUMENTS

JP          4-342333        11/1992
JP          11-355334       12/1999

* cited by examiner

Primary Examiner—Robert Beausoliel
Assistant Examiner—Michael Maskulinski
(74) Attorney, Agent, or Firm—Foley & Lardner

(57) ABSTRACT

A system and method of detecting/eliminating a faulty port in a fiber channel-arbitrated loop, which implements early location/elimination of a port which causes a faulty on a loop in an FC-AL. If no faulty is found in loop 7 at step 914, it can be determined that its own port normally works. Then, an enable instruction is issued to a node destined to a port on the loop 7 from loop 8 at step 915. If a fault is detected in the loop 7 at step 916, it can be determined that the port which has issued the enable instruction at step 915 has been issued faulty. The port which has issued the enable instruction at step 915 is registered as a faulty port at step 918. A bypass instruction is issued from the loop 8 at step 919.

5 Claims, 2 Drawing Sheets

US 6,546,498 B1

SYSTEM AND PROCESS FOR DETECTING/ELIMINATING FAULTY PORT IN FIBER CHANNEL-ARBITRATED LOOP

FIELD OF THE INVENTION

The present invention relates to a system using a fiber channel-arbitrated loop (hereinafter referred to as "FC-AL") and in particular to a process for detecting/eliminating a faulty port in the FC-AL.

BACKGROUND OF THE INVENTION

Processing for detecting/eliminating a faulty port in prior art FC-AL will be described with reference to FIG. 2.

Each port carries out recovery processing by reinitializing a loop if a fault occurs in a port, which gives an adverse affect upon the loop in a system using the FC-AL.

If the fault occurs in a port 17, which gives an affect upon the loop 7 in FIG. 2, a port 27 which detects the fault on the loop 7 will transmit an LIP (Loop Initialization Protocol, a signal of loop initialization protocol) to inform other ports of the fault. A port which has received the LIP will forward the received LIP to a next other port. This causes a fiber channel protocol controller of each port to detect the occurrence of the fault for conducting only reinitialization of the loop 7. Japanese Patent Kokai Publication No. JP-A-10-161238 describes that each port records a fault log and conducts early detection/elimination of a port which causes a fault by analyzing the log.

SUMMARY OF THE DISCLOSURE

However, it has turned out in course of investigations toward the present invention that prior art processing for detection/elimination of a faulty port has problems as follows:

A first problem resides in that it takes an extended period of time to locate a faulty port since the detection/elimination of the faulty port involves in the following sequence: recording a log, analyzing the log, assuming a faulty port and manually eliminating the faulty port. This is due to the fact that location of the faulty log is based upon assumption by log analysis.

A second problem resides in that it is impossible to achieve early recovery of a system since elimination of the faulty port requires a human intervention. Thus there is much to be desired in the prior art in the processing for detection/elimination of the faulty port.

It is therefore an object of the present invention to provide a system and process for detecting/eliminating a faulty port in a fiber channel-arbitrated loop, which achieves early location/elimination of the port which causes a fault in the loop in a FC-AL, without any human intervention.

According to a first aspect of the present invention, there is provided a system for detecting/eliminating a faulty port in a fiber channel-arbitrated loop, which comprises a plurality of nodes, a first loop comprising the plurality of nodes, a first port of each of the nodes for connecting each node with the first loop, first hub which is a connecting device for implementing loop connections, a second loop comprising the plurality of nodes, a second port connecting each node with said second loop, a second hub which is a connecting device for implementing loop connections, and means for controlling bypass/enable operation for the port of the loop in which a fault occurs in response to an instruction from a host of the other port of the doubled ports. Namely, the first and second ports constitute a double ports structure.

The port which has detected the loop fault may comprise:

means for checking whether or not a port which has detected a loop fault is a bypass/enable instruction issuing port for which its own port has a bypass-enable instruction right;

means for issuing an instruction to bypass all ports other than the own port from a normal port if the own port is the instruction issuing port;

means for bypassing the nodes which have received the bypass instruction by terminating transmission of light through ports connected with the faulty loop, and for making up the faulty loop of only a hub and the own port when the bypassing is completed;

means for registering the own port as a faulty port if the fault continues due to the hub and the own port even after the faulty loop has been made up of only the hub and own port;

means for bypassing the own port to make up the faulty loop of only the hub, and for assigning the bypass/enable instruction right to the other port from the normal loop and simultaneously transferring the registration information of the faulty port; and means for registering all ports as faulty port if the hub is faulty when the port to which the bypass/enable instruction right has been assigned executes the same processing on any unchecked node and for closing the faulty loop.

The present system may comprise:

means for determining that the own port normally works if no fault is detected when the faulty loop is made up of only a hub and its own port;

means for issuing an enable instruction to a desired node destined to a port on the faulty loop from a normal loop;

means for registering the port which has issued an enable instruction as a faulty port by determining that there is a fault in the port which has issued the enable instruction if a faulty loop is detected and for recovering the faulty loop to a normal condition again by issuing a bypass instruction from the normal loop; and means for terminating a processing when checking of all the ports is completed by performing the same processing for unchecked port if checking of all ports is not completed under proviso that the number of faulty ports be not limited to one.

In a second aspect of the present invention, there is provided a process for detecting/eliminating a faulty port in a fiber channel-arbitrated loop of the present invention. The process may comprise the step of controlling the bypass/enable operation for the port or ports on a loop in which a fault occurs, in response to an instruction from a host of the other port of the doubled ports.

A process for detecting/eliminating a faulty port in the detecting/eliminating system in a fiber channel-arbitrated loop may comprise the steps of:

checking, by a port which has detected a loop fault, whether or not its own port is a bypass/enable instruction issuing port having a bypass-enable instruction right;

issuing an instruction to bypass all ports other than the own port from a normal port, using a normal loop, if the own port is the instruction issuing port;

bypassing the nodes which have received the bypass instruction by terminating transmission of light through ports connected with the faulty loop, and for making up the faulty loop of only a hub sand the own port when the bypassing is completed;

registering the own port as a faulty port if the fault continues due to the hub and the own port even after the faulty loop has been made up of only the hub and own port;

by passing the own port to make up the faulty loop of only the hub, and assigning the bypass/enable instruction right to the other port from the normal loop and for simultaneously transferring the registration information of the faulty port; and registering all ports as faulty port if the hub is faulty when the port to which the bypass/enable instruction right has been assigned executes the same processing on any unchecked node and for closing the faulty loop.

A process for detecting/eliminating a faulty port in the detecting/ eliminating system in a fiber channel-arbitrated may comprise the steps of:

determining that said own port normally works if no fault is detected when said faulty loop is made up of only a hub and its own port;

issuing an enable instruction to a desired nor destined to a port on said faulty loop from a normal loop;

registering said port which has issued an enable instruction as a faulty port by determining that there is a fault in the port which has issued the enable instruction if a faulty loop is detected and for recovering said faulty loop to a normal condition again by issuing a bypass instruction from said normal loop; and terminating a processing when checking of all said ports is completed by performing said same processing for unchecked port if checking of all ports is not completed under proviso that the number of faulty ports be not limited to one.

A process and system for detecting/eliminating a faulty port in accordance with the present invention is characterized in that bypass/enable control (operation) of the port in which a fault occurs is controlled by using another loop in the doubled or duplex structure.

Therefore, the faulty port can be eliminated (or suppressed) by bypassing the same and recovery of the faulty loop can be early achieved without any intervention of human manipulation.

PREFERRED EMBODIMENTS OF THE INVENTION

Figure 2:
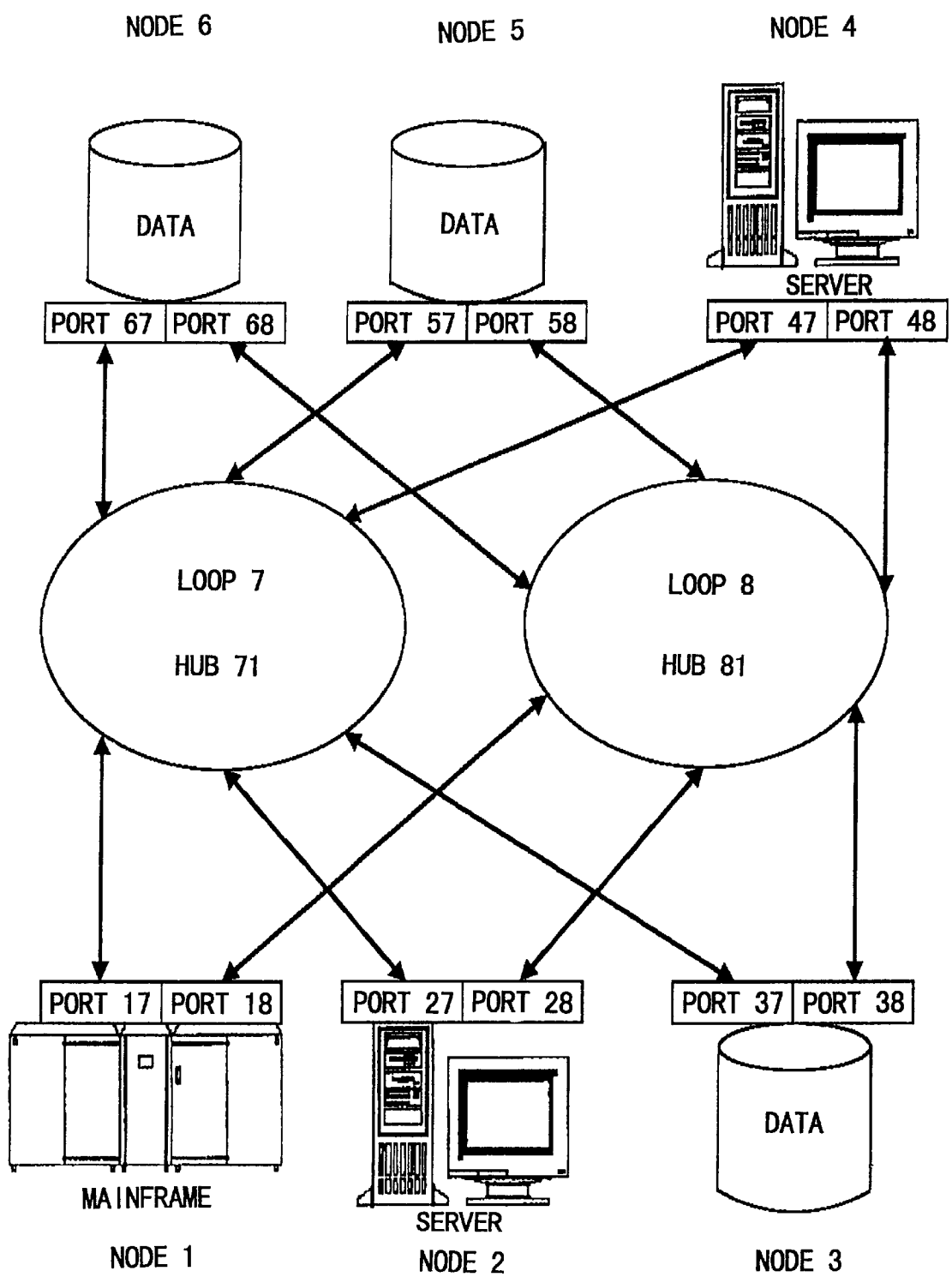
[FIG. 2] A schematic diagram showing the configuration of an FC-AL.

In FIG. 2, a loop 7 comprises nodes 1 to 6. Connection of the loop 7 with each of the nodes 1 to 6 is achieved through ports 17 to 67, respectively. A loop 8 comprises nodes 1 to 6. Connection of the loop 8 with each of the nodes 1 to 6 is achieved through ports 18 to 68, respectively. In order to achieve loop connection, a connection device which is referred to as "hub" is usually used. It is assumed that the loops 7 and 8 are implemented by hubs 71 and 81, respectively.

Operation in the event of a fault in the loop will be described with reference to FIG. 2. Each of hubs constitutes a loop by conducting control of bypass/enable operation within the hub by recognizing whether any of its port is connected or not, based upon the transmission of light from the port.

If one loop is normally operative, control of bypass/enable operation of the port is possible according to the regulation of FC-AL. However, the loop can not be recovered to a normal condition even when any port at which a fault has been detected is reinitialized in case of a fault such that a bypass/enable signal can not be detected.

If a fault occurs in the port 67 so that an abnormal condition continuously occurs in the loop 7, it is impossible for all the other ports to use the loop 7. Since in this occasion this abnormal condition can be detected at each of the nodes 1 to 6, an instruction to bypass all the ports of the loop 7 by using the loop 8 is issued from one node to the other nodes. A port which has received this bypass instruction terminates transmission of light from the ports which are connected to the loop 7. The bypass is achieved by the hub 71 detecting the termination.

Enabling operation is achieved by initiating the transmission of light again in response to an enable instruction from the port which has issued the bypass instruction. The port which issues the instruction is adapted to issue an instruction to each of the other ports and identify and omit the continuously faulty port by monitoring the conditions of the loop 7.

Determining which port will issue an instruction may be prescribed in a system according:

1. system configuration presetting
2. loop master on loop initialization, and
3. port which acquires AL-PA value having a higher priority (ID value which is allocated to each of the ports on the loop).

Figure 1:
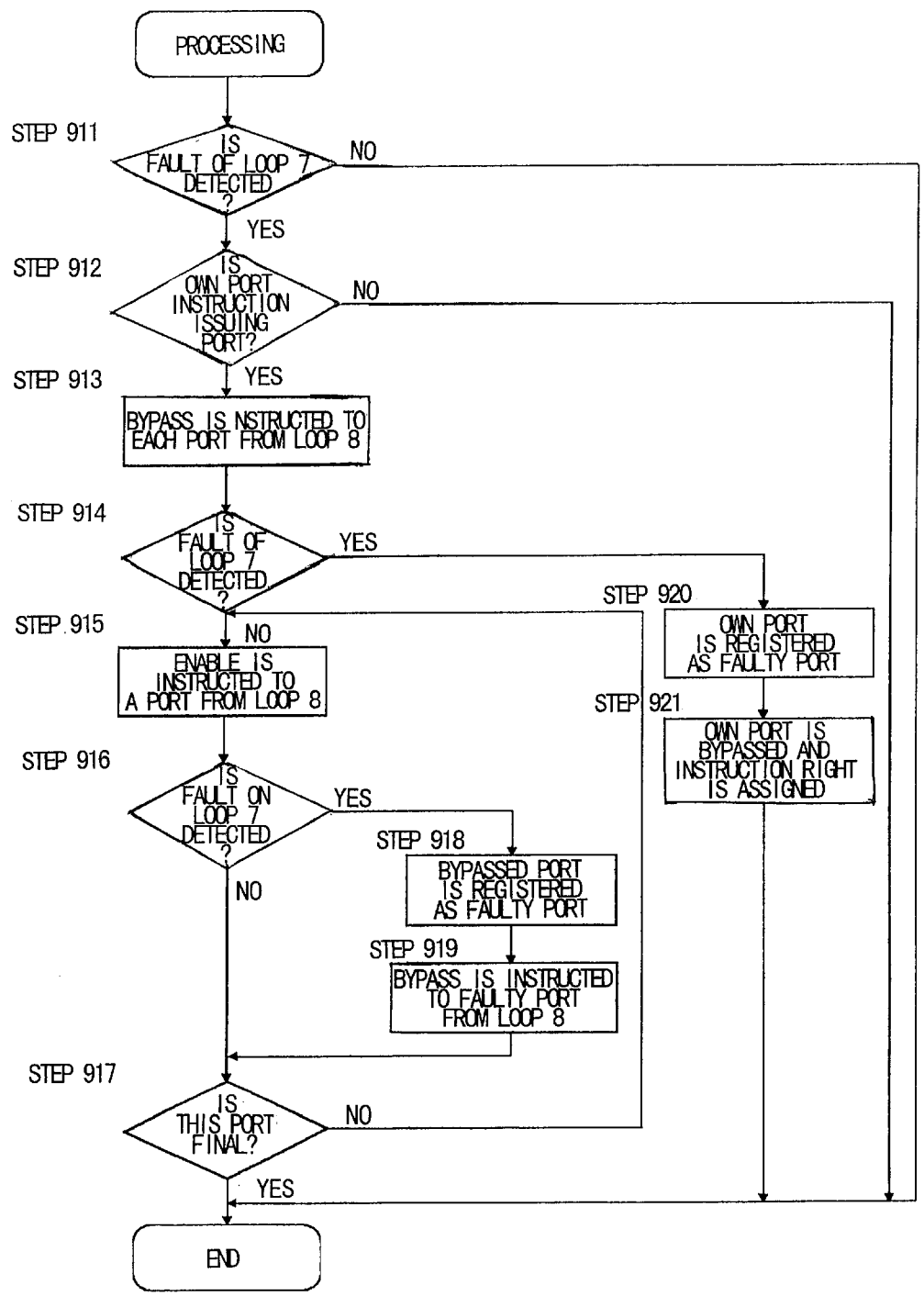
[FIG. 1] A flow chart of bypass/enable control of ports.

Processing in the node which issues the above-mentioned instruction will now be described with reference to FIG. 1.

The port which has detected the loop fault of the loop 7 at step 911 will check whether or not its own port is the port which has issued the bypass/enable instruction at step 912. If the port is the instruction issuing port, the program sequence will proceed to step 913. At step 913, an instruction for bypassing all ports other than its own port is issued from the normal loop 8. The node which has received a bypass instruction will terminate the transmission of light through the ports which are connected to the loop 7 to bypass the ports. When the bypassing is completed, the loop 7 is made up of only the hub and its own port. If a fault is continuous in the loop 7 at 914, it is found that the fault is caused by its hub and/or its own port. In this case, the program sequence will proceed to step 920, at which its own port is registered as a faulty port. The own port is bypassed at step 921. Since the loop 7 is made up of only the hub due to the fact that its own port is bypassed, a right of bypass/enable instruction is assigned to the other port by using the loop 8. Simultaneously with this, information on the registration of the faulty port is transferred. Thereafter, the port to which the bypass-enable instruction right has been assigned conducts the same processing for nodes which have not been checked. If the hub is faulty, all the ports would be registered as faulty ports, and thus the loop 7 would be closed.

If no fault is found in the loop 7 at step 914, it can be determined that its own port is normally operative. Then, an enable instruction is issued to one node destined to a port on the loop 7 from the loop 8 at step 915. If a fault is detected in the loop 7 at step 916, it can be determined that the port which has issued an enable instruction at step 915 is faulty. Then, the port which has issued the enable instruction at step 915 is registered as a faulty port at step 918. A bypass instruction is issued from the loop 8 at step 919. This bypass instruction causes the loop 7 to return to a normal condition again. Since the number of the faulty ports is not always one, it is checked whether or not all the ports have been checked. Otherwise, the program sequence will return to step 915 at which the same processing for the unchecked port is conducted. If check of all the ports is completed, processing is terminated at step 917.

Conducting of the above-mentioned processing by use of normal loop 8 which is made up to the doubled structure as mentioned above makes it possible to exclude any port which has made the loop 7 faulty and to conduct the early location and elimination of the faulty port without any manual innervation.

As mentioned above, the present invention has advantages as follow:

Elimination of the port which causes the loop 7 to be faulty can be eliminated by conducting the above-mentioned processing through the use of the normal loop 8 which is another one of the doubled loop structure as mentioned above so that early location and elimination of the faulty port is made possible without any manual intervention.

It should be noted that other objects, features and aspects. of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A system for detecting and eliminating a faulty port in a fiber channel-arbitrated loop, comprising:
    a plurality of nodes, each node comprising a first and a second port, the first ports of said nodes being connected to a first hub to form a first loop, and the second ports of said nodes being connected to a second hub to form a second loop;
    means for determining whether a port that has detected a loop fault is a bypass/enable instruction issuing port having a bypass/enable instruction right;
    means for issuing an instruction to bypass all ports other than said port that has detected a loop fault from a normal port if said port that has detected the loop fault is said instruction issuing port;
    means for bypassing nodes that have received the bypass instruction by terminating transmission of light through ports of said nodes connected with said faulty loop, such that said loop consists of only a hub and said port that has detected the loop fault when the bypassing is completed;
    means for registering said port that has detected a loop fault as a faulty port if the fault continues once said faulty loop consists of only the hub and the port that has detected the loop fault;
    means for bypassing the port that detected the loop fault as a faulty port such that the faulty loop consists of only said hub, and for assigning the bypass/enable instruction right to another port through a normal loop other than the faulty loop and transferring the registration information of the faulty port if the port that detected the loop fault is a faulty port; and
    means for registering all ports as faulty ports if said hub is faulty when the port to which the bypass/enable instruction right has been assigned detects a loop fault, to thereby close said faulty loop.

2. A system for detecting and eliminating a faulty port in a fiber channel-arbitrated loop as defined in claim 1, further comprising:
    means for determining that the port that has detected a loop fault works normally if no fault is detected when said faulty loop consists of only a hub and the port that has detected the loop fault;
    means for issuing an enable instruction to a port of a node on the faulty loop through a loop other than the faulty loop;
    means for registering a port that receives said enable instruction as a faulty port by determining that there is a fault in the port which has received the enable instruction if a faulty loop is detected after the enable instruction is received and for recovering said faulty loop to a normal condition again by issuing a bypass instruction through said loop other than the faulty loop to bypass the port that received the enable instruction; and
    means for terminating processing when checking of all said ports is completed and checking an unchecked port if checking of all ports is not completed.

3. A process, in a fiber channel-arbitrated loop system comprising a plurality of nodes, each node comprising a first and a second port, the first ports of said nodes being connected to a first hub to form a first loop, and the second ports of said nodes being connected to a second hub to form a second loop, for detecting and eliminating a faulty port by controlling a bypass/enable operation for a faulty port in response to an instruction from another node of the fiber channel arbitrated loop, the process comprising:
    determining, by a port that has detected a, loop fault of a faulty loop, whether the port is a bypass/enable instruction issuing port having a bypass/enable instruction right;
    if the port that has detected the loop fault is a bypass/enable instruction issuing port, issuing, by the node of the port that detected the loop fault, an instruction to bypass all ports other than the port that detected the loop fault, said instruction being issued from a normal port of said node through a loop other than said faulty loop;
    bypassing ports of nodes which have received the bypass instruction by terminating transmission of light through ports of said nodes connected to said faulty loop, such that the faulty loop consists of only a hub and the port that has detected the loop fault;
    if the fault continues once said faulty loop consists of only the hub and the port that detected the loop fault, registering the port that detected the loop fault as a faulty port, bypassing the port that detected the loop fault such that the faulty loop consists of only said hub, assigning the bypass/enable instruction right to another port through said loop other than said faulty loop, and transferring the registration information of the faulty port; and
    registering all ports as faulty ports if said hub is faulty when the port to which the bypass/enable instruction right has been assigned detects a loop fault to thereby close said faulty loop.

4. A process for detecting/eliminating a faulty port in a fiber channel-arbitrated loop as defined in claim 3, comprising the further steps of:
    determining that the port that detected the loop fault is a normal port if no fault is detected when said faulty loop is made up of only the hub and the port that detected the loop fault;
    issuing from the port that detected the loop fault an enable instruction to a node having a port on said faulty loop through a loop other than said faulty loop;
    registering said port that has received an enable instruction as a faulty port if a faulty loop is detected after the enable instruction is received, and recovering said faulty loop to a normal condition by issuing a bypass instruction through said loop other than said faulty loop to bypass the port that received said enable instruction; and terminating processing when checking of all said ports is completed and checking an unchecked port if checking of all ports is not completed.

5. A process, in a fiber channel-arbitrated loop system comprising a plurality of nodes, each node comprising a first and a second port, the first ports of said nodes being connected to a first hub to form a first loop, and the second ports of said nodes being connected to a second hub to form a second loop, for detecting and eliminating a faulty port, the process comprising:

in a first port of the first loop, detecting a loop fault;

if the first port has a bypass/enable instruction issuing right, issuing a bypass/enable instruction to nodes of other ports of said first loop by the node of the first port through the second loop, such that all ports of the first loop other than said first port and a hub of said first loop are bypassed;

if the loop fault is still detected in the first port, registering the first port as a faulty port, bypassing the first port and assigning the bypass/enable instruction issuing right to a second port of the first loop through said second loop; and if the loop fault is not still detected in the first port, issuing a bypass/enable instruction to a second port of the first node to enable said second port and detecting whether a loop fault occurs as a result of enablement of said second port, wherein ports of the first loop are successively enabled to identify a port of the first loop causing a loop fault in the first loop and said port causing the loop fault is disabled after being identified.

* * * * *